(12) United States Patent
Bjork et al.

(10) Patent No.: US 10,524,604 B2
(45) Date of Patent: Jan. 7, 2020

(54) FOOD STEAMER

(75) Inventors: Anders Joel Bjork, Eindhoven (NL); Bernhard Schratter, Eindhoven (NL); Christian Thomas Schmied, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 731 days.

(21) Appl. No.: 13/883,774

(22) PCT Filed: Nov. 3, 2011

(86) PCT No.: PCT/IB2011/054893
§ 371 (c)(1),
(2), (4) Date: May 7, 2013

(87) PCT Pub. No.: WO2012/063170
PCT Pub. Date: May 18, 2012

(65) Prior Publication Data
US 2013/0228079 A1    Sep. 5, 2013

(30) Foreign Application Priority Data

Nov. 11, 2010 (EP) .................................. 10190777

(51) Int. Cl.
*A47J 27/04* (2006.01)
(52) U.S. Cl.
CPC ......... *A47J 27/04* (2013.01); *Y10T 137/6851* (2015.04)
(58) Field of Classification Search
CPC ............................ Y10T 137/6851; A47J 27/04
USPC ..................................... 99/330, 403; 137/343
See application file for complete search history.

(56) References Cited

U.S. PATENT DOCUMENTS 2,570,509 A * 10/1951 Bandli ................. B63H 20/245
123/65 V
3,408,922 A * 11/1968 Mencacci ................. A23B 4/06
198/597
3,559,427 A * 2/1971 Baker ..................... D06F 75/30
68/222
3,779,396 A * 12/1973 Zielinski ................. B61G 9/08
213/223
(Continued)

FOREIGN PATENT DOCUMENTS

CH          652293      11/1985
CN        1038930 A      1/1990
(Continued)

OTHER PUBLICATIONS

Minghua Ou; Pressure cooker outer-spray stem food steamer; May 27, 2009, CN201243941 Y, 11-page.Espacenet.*

*Primary Examiner* — Dana Ross
*Assistant Examiner* — Kuangyue Chen

(57) ABSTRACT

The present invention relates to a food steamer. The food steamer comprises a food preparation chamber (2), a steam generator (3) communicating with the food preparation chamber (2) so that steam is able to flow from the steam generator (3) to the food preparation chamber (2), and a contaminant prevention means (8) configured to prevent the ingress of contaminants from the food preparation chamber (2) into the steam generator (3). The present invention also relates to an apparatus for preventing the ingress of contaminants from a food preparation chamber (2) into a steam generator (3) of a food steamer.

13 Claims, 2 Drawing Sheets

(56) References Cited

U.S. PATENT DOCUMENTS

| | | | | |
|---|---|---|---|---|
| 3,942,564 A | * | 3/1976 | Nakazato | B67D 7/06 |
| | | | | 141/311 R |
| 4,577,840 A | * | 3/1986 | Meller | B60G 17/044 |
| | | | | 137/843 |
| 4,872,474 A | * | 10/1989 | Middleton | A47J 37/1233 |
| | | | | 137/493.8 |
| 6,014,986 A | * | 1/2000 | Baumgarten | A47J 27/09 |
| | | | | 137/522 |
| 6,723,963 B2 | | 4/2004 | Ronda | |
| 2002/0112612 A1 | * | 8/2002 | Cusenza | A47J 27/18 |
| | | | | 99/330 |
| 2007/0157824 A1 | * | 7/2007 | Cohen | A47J 36/08 |
| | | | | 99/403 |
| 2009/0031608 A1 | * | 2/2009 | Burgeson | A01M 31/008 |
| | | | | 43/1 |

FOREIGN PATENT DOCUMENTS

| | | | |
|---|---|---|---|
| CN | 2474048 | | 1/2002 |
| CN | 200948063 Y | | 9/2007 |
| CN | 201029748 Y | | 3/2009 |
| CN | 201243941 | | 5/2009 |
| CN | 201243941 Y | * | 5/2009 |
| CN | 201260600 | | 6/2009 |
| CN | 201370443 Y | | 12/2009 |
| EP | 0972477 B1 | | 1/2000 |
| GB | 2448366 A | | 10/2008 |

* cited by examiner

FOOD STEAMER

FIELD OF THE INVENTION

The present invention relates to a food steamer. Furthermore, the present invention also relates to an apparatus for preventing the ingress of contaminants from a food preparation chamber into a steam generator of a food steamer.

BACKGROUND OF THE INVENTION

Food steamers are well known devices for the preparation of food. A conventional food steamer generally comprises a food preparation chamber and a steam generator including a water boiler. Foodstuffs are placed in the food preparation chamber and the steam generator communicates with the food preparation chamber via a steam passageway through which steam generated by the steam generator is expressed into the food preparation chamber.

In general, an outlet from the steam passageway into the food preparation chamber is positioned in a lower part of the food preparation chamber so that steam exhausted into the steam passageway flows upwardly through the food preparation chamber, and is generally exhausted from the food preparation chamber through vents formed in the upper end of the food preparation chamber.

However, a problem with a conventional arrangement of food steamers is that contaminants from the food may enter the steam generator through the steam passageway. These contaminants are generally difficult to remove from the steam generator and so are known to form residues inside the steam generator that may reduce the function of the food generator, as well as cause bad odors and/or bacterial growth. This may lead to a health risk for a user of the food steamer. The residue may also adhere to the heating elements leading to the formation of burned foodstuffs that may contain substances that even in small concentration may pose a health hazard.

SUMMARY OF THE INVENTION

Therefore, it is an object of the invention to provide a food steamer and/or an apparatus for preventing the ingress of contaminants from a food preparation chamber into a steam generator of a food steamer which substantially alleviates or overcomes the problems mentioned above.

According to the present invention, there is provided a food steamer comprising a food preparation chamber, a steam generator communicating with the food preparation chamber by a steam passageway so that steam is able to flow from the steam generator to the food preparation chamber, and a contaminant prevention means configured to prevent the ingress of contaminants from the food preparation chamber into the steam generator, wherein the contamination prevention means comprises a housing acting as a valve seat and a valve member, wherein the housing is removably mountable to the steam passageway to form part of the steam passageway.

Preferably, the contaminant prevention means is a check valve.

The contaminant prevention means may be disposed at a steam inlet of the steam passageway.

The housing may be disposed in the food preparation chamber.

The contaminant prevention means may be disposed at a steam entrance of the steam passageway.

Preferably, the contaminant prevention means comprises a handle to ease removal and/or mounting of the contaminant prevention means.

Conveniently, the handle extends form the housing.

In one embodiment, the valve member is configured to move between a closed position, wherein communication between the food preparation chamber and the steam generator is prevented, and an open position in which steam flows through the steam passageway between the steam generator and the food preparation chamber.

The check valve may be configured to prevent a flow of steam along the steam passageway until the steam pressure is sufficient to prevent a return flow of contaminants along the steam passageway.

The contaminant prevention means may be configured to form a fluid seal when steam is not flowing from the steam generator to the food preparation chamber.

Advantageously, the check valve is a resilient plate valve.

Conveniently, the steam generator comprises a boiler and a negative pressure release means configured to allow the flow of air from outside the food steamer into the boiler when a negative pressure is formed in the boiler.

Preferably, the negative pressure release means is integrally formed with a seal of the boiler.

According to another aspect of the present invention, an apparatus for preventing the ingress of contaminants from a food preparation chamber into a steam generator of a food steamer through a steam passageway, comprising a housing acting as a valve seat and a valve member, wherein the housing is configured to be removably mounted to the steam passageway to form part of the steam passageway disposed between a food preparation chamber and a steam generator to prevent the ingress of contaminants into the steam generator.

BRIEF DESCRIPTION OF THE DRAWINGS

Preferred embodiments of the invention will now be described, by way of example only, with reference to the accompanying drawings, in which.

DETAILED DESCRIPTION OF THE EMBODIMENTS

Figure 1:
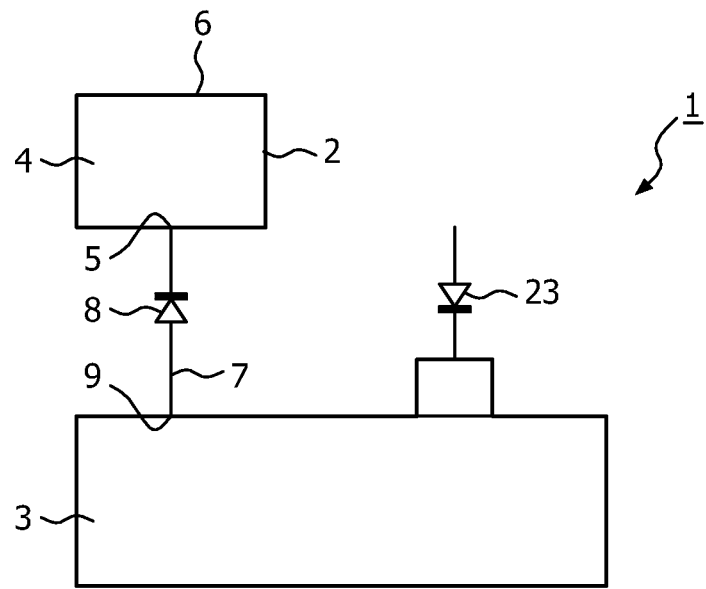
FIG. 1 shows a schematic view of a food steamer.

Referring now to FIG. 1, a schematic drawing of a food steamer 1 is shown. The food steamer 1 comprises a food preparation chamber 2 and a steam generator 3. The food preparation chamber 2 and steam generator 3 are generally removably mounted to each other to allow ease of cleaning.

The food preparation chamber 2 comprises a food receiving space 4 and a steam inlet 11. The food preparation chamber 2 also includes a removable cover 6 to allow access to the food receiving space 4, in which food stuffs are placed. Vents (not shown) to allow steam to exhaust from the food preparation chamber 2 are formed in the cover 6.

The steam inlet 11 is formed in a lower part of the food preparation chamber 2, and the food preparation chamber 2 and steam generator 3 communicate with each other via a steam passageway 7 which extends between the steam generator 3 and the food preparation chamber 2. The steam inlet 11 forms the opening of the steam passageway 7 to the food preparation chamber 2. The steam passageway 7 fluidly communicates the steam generator 3 and the food preparation chamber 2 so that steam generated in the steam generator 3 can flow to the food preparation chamber 2.

A contamination prevention means 8 is disposed along the steam passageway 7 and prevents any contaminants in the food preparation chamber 2, for example any solids or liquids from food stuffs disposed in the food preparation chamber 2, from moving through the steam passageway 7 to the steam generator 3.

The contamination prevention means 8 comprises a check valve, also known as a non-return valve, which allows the movement of fluids or solids through the contamination prevention means 8 in one direction only, and does not allow the movement of fluids or solids in the opposing direction. The contamination prevention means 8 includes a movable valve member which moves between a closed position, in which the movement of fluids or solids is prevented, and an opening position, in which the movement of fluids or solids is allowed in one direction only.

In the present embodiment, the contamination prevention means 8 is disposed at the steam inlet 11. However it will be appreciated that the contamination prevention means 8 may be located at any point on the path between the steam generator 3 and the food preparation chamber 2. In another embodiment, the contamination prevention means 8 is disposed at an outlet 9 of the steam generator 3 to the steam passageway 7, or is formed in the steam passageway 7. Alternatively, the contamination prevention means 8 extends over the steam inlet 11 and extends from the steam inlet 11 into the food preparation chamber 2.

The contamination prevention means 8 is removably mounted in the food steamer. An advantage of a removably mountable contamination prevention means 8 is to aid cleaning of the food steamer.

When the steam generator 3 is not in operation the contamination prevention means 8 is in a closed position and forms a seal so that any fluids or solids disposed in the food preparation chamber 2, for example liquid or solids expressed from food stuffs placed in the food preparation chamber 2 by a user, cannot pass into the steam generator 3. In particular, a fluid seal is formed by the contamination prevention means 8 so that, even if the contamination prevention means 8 is submerged by fluid, the fluid cannot flow from the food preparation chamber 2 to the steam generator 3.

When the steam generator 3 is operated, steam under a high pressure is produced. The steam generator 3 comprises a water supply means (not shown) and a boiler (not shown). The water supply means feeds water to the boiler, which heats the water and converts the water to steam. The steam is then fed to the entrance 9 to the steam passageway 7. The contamination prevention means 8 initially remains in its closed position, however as the steam generator 3 produces steam, the pressure of the steam increases and the contamination prevention means 8 is urged into an open position so that steam flows past the contamination prevention means 8 and into the food preparation chamber 2.

The contamination prevention means 8 is configured to open gradually, dependent on the pressure of the steam, so that the steam passes through the contamination prevention means 8 at a high velocity when the contamination prevention means 8 is in an open position. The steam at a high velocity therefore urges fluids and/or solids away from the contamination prevention means 8 and prevents the fluids and/or solids from passing into the steam generator 3.

Figure 2:
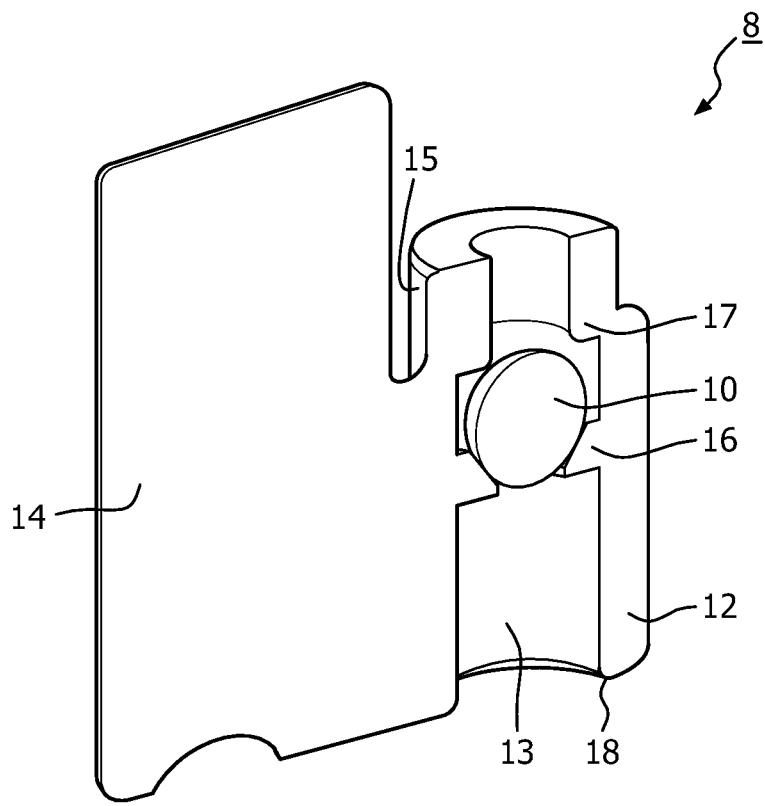
FIG. 2 shows a perspective cross-sectional view of a contaminant prevention means of a food steamer.

One embodiment of the contaminant prevention means 8 is shown in FIG. 2. In this embodiment, the contaminant prevention means 8 comprises a ball valve, acting as a valve member 10, disposed in a housing 12. The housing 12 has a bore 13 formed through it, and a handle 14 extends from an outer surface 15 of the housing 12.

The valve member 10 is disposed in the bore 13 and locates on a circumferentially extending ridge acting as a seat 16 to receive the valve member 10. A stop 17 is spaced from the seat 16 to limit the movement of the valve member 10 in the bore 13. A lower end 18 of the housing 12 forms a connection means which mounts to and fluidly seals with the steam outlet 9. The steam inlet 5 is formed in a base of the food preparation chamber 2 and the lower end 18 of the housing 12 is mountable to the steam outlet 9 and upstands there from. The bore 13 therefore forms part of the steam passageway. The contamination prevention means 8 is removable from the steam outlet 9 to aid cleaning.

In a closed position, the valve member 10 abuts the seat 16 and fluidly seals there against to form a fluid seal of the steam passageway 7. The valve member 10 is urged against the seat by gravity, although it will be appreciated that other or additional urging means may be used, for example a resilient member.

When the steam generator 3 is operated, steam under a high pressure is produced in the steam generator 3. The steam pressure acts on the valve member 10 and urges the valve member 10 from its closed position to an open position, wherein the valve member 10 is urged away from its seat 16 when a sufficient steam pressure is generated. Therefore, the steam flows through the contamination prevention means 8 at an adequate velocity to urge any fluid or solids away from the contamination prevention means 8 so that it cannot flow into the steam generator 3. It will be appreciated that the valve member 10 has a higher density than water to prevent the valve member moving into an open position when the contamination prevention means 8 is immersed in water.

Although in the above described embodiments the check valve is a ball valve, it will be appreciated that the check valve may be any suitable non-return valve arrangement, for example a duck bill valve, a diaphragm valve, an umbrella valve, a disk valve, or a double check valve.

Figure 3:
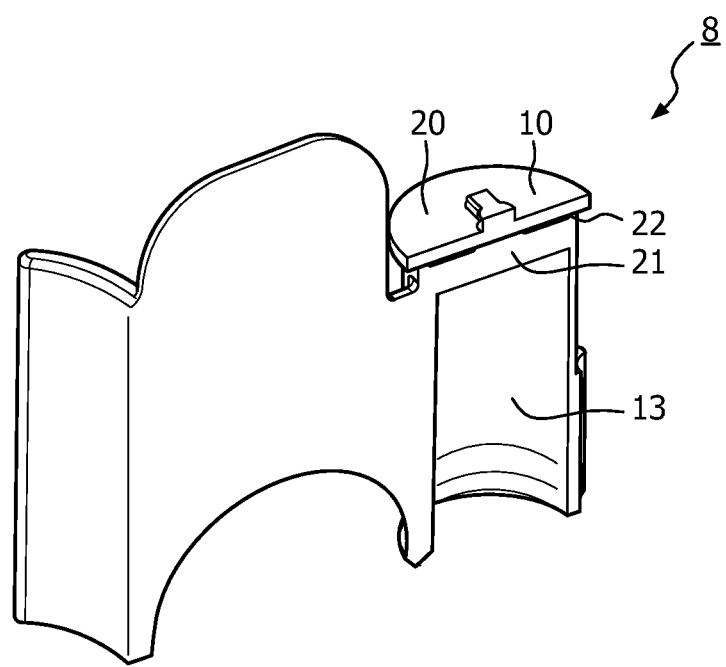
FIG. 3 shows a perspective cross-sectional view of another contaminant prevention means of a food steamer.

Another embodiment of the contaminant prevention means 8 is shown in FIG. 3. In this embodiment, the contaminant prevention means 8 comprises a resilient plate valve, acting as a valve member 10. This embodiment of the contaminant prevention means 8 is generally the same as the embodiment discussed above and so a detailed description will be omitted herein.

The valve member 10 is a deformable and resilient circular rubber plate 20 disposed at an upper end 21 of the bore 13 and locates on a circumferentially extending rim 22 acting as a valve seat against which the valve member 10 seals. The circular rubber plate 20 is fixedly mounted at its centre to limit the movement of the valve member 10. The bore 13 therefore forms part of the steam passageway and is fluidly sealed at its upper end 21 by the valve member 10.

In a closed position, the valve member 10 abuts the rim 22 and fluidly seals there against to form a fluid seal of the steam passageway 7. The rubber plate 20 is urged against the seat due to its resilience.

When a high steam pressure acts on the valve member 10 the rubber plate 20 is resiliently deformed from its closed position to an open position, wherein an edge of the rubber plate 20 is urged away from its seat when a sufficient steam pressure is generated. Therefore, the steam flows through the contamination prevention means 8 at an adequate velocity to urge any fluid or solids away from the contamination prevention means 8 so that it cannot flow into the steam generator 3.

The steam generator 3 also has a one-way valve 23 acting as a negative pressure release means (refer to FIG. 1). The one-way valve 23 communicates the boiler (not shown) with the atmospheric air outside the steam generator 3. The one-way valve is arranged to allow the flow of air into the boiler when a negative pressure is generated in the boiler, but to allow the generation of a positive steam pressure in the boiler when steam is produced by the boiler.

When the steam generator 3 is stopped following operation, there is a phase of rapid condensation in the boiler as the steam retained in the boiler cools down. The condensation of the steam in the boiler creates a negative pressure in the boiler, and air is prevented from flowing from the food preparation chamber 2 by the contamination prevention means 8. However, the one-way valve 23 allows air to flow into the boiler and so relieves the negative pressure generated therein. An advantage of the above arrangement is that prevents air containing fluid and solids from the food preparation chamber 2 flowing into the steam generator 3 through the steam passageway 7 and prevents the boiler from imploding or being damaged due to the negative pressure generated in the boiler.

Although in the above described embodiment, the negative pressure release means is a one way valve 23, it is also envisaged that the one-way valve is integrally formed with a seal (not shown) of the boiler, so that air can flow into the boiler when a predetermined negative pressure is achieved in the boiler.

Although claims have been formulated in this application to particular combinations of features, it should be understood that the scope of the disclosure of the present invention also includes any novel features or any novel combinations of features disclosed herein either explicitly or implicitly or any generalization thereof, whether or not it relates to the same invention as presently claims in any claim and whether or not it mitigates any or all of the same technical problems as does the parent invention. The applicants hereby give notice that new claims may be formulated to such features and/or combinations of features during the prosecution of the present application or of any further application derived there from.

The invention claimed is:

1. A food steamer comprising:
   a food preparation chamber including a steam inlet formed in a lower part,
   a steam generator comprising a water supply means and a boiler, the steam generator configured to communicate with the food preparation chamber by a steam passageway extending between the steam generator and the food preparation chamber to allow the steam to flow from the steam generator to the food preparation chamber,
   wherein the water supply means is arranged to feed water to the boiler for heating the water and convert the water to steam, and
   a contamination prevention means disposed along the steam passageway and configured to prevent the ingress of contaminants from the food preparation chamber into the steam generator,
   the contamination prevention means comprising:
      a housing acting as a valve seat,
      a valve member arranged in a bore of the housing, the valve member having a higher density than water to prevent the valve member from moving into an open position when the contamination prevention means is immersed in water, and
   wherein the housing forms a part of the steam passageway which extends between the steam generator and the food preparation chamber,
   the housing comprising:
      a stop spaced apart from and above the valve seat to limit movement of the valve member in the bore, and
      an integrated handle extending from an outer surface of the housing, the integrated handle having a rectangular configuration hingedly coupled to the housing, wherein the housing is removably mountable to the steam passageway via the integrated handle, and
   wherein the contamination prevention means is configured to open gradually dependent on the pressure of the steam, such that steam passes through the contamination prevention means at a high velocity when the contamination prevention means is in an open position, wherein the high velocity steam urges fluids and solids away from the contamination prevention means and prevents the fluids and solids from passing into the steam generator,
   wherein in a non-operating mode, the contamination prevention means is in a closed position and forms a seal so that any fluids or solids disposed in the food preparation chamber cannot pass into the steam generator, and
   wherein the housing is removably mountable to the steam passageway to form part of the steam passageway which extends between the steam generator and the food preparation chamber.

2. The food steamer according to claim 1, wherein the contamination prevention means is a check valve.

3. The food steamer according to claim 1, wherein the contamination prevention means is disposed at a steam inlet of the food preparation chamber.

4. The food steamer according to claim 1 wherein the housing is disposed in the food preparation chamber.

5. The food steamer according to claim 1, wherein the contamination prevention means is disposed at a steam entrance of the steam passageway.

6. The food steamer according to claim 1, wherein the contamination prevention means comprises a handle to ease removal or mounting of the contamination prevention means.

7. The food steamer according to claim 6, wherein the handle extends from the housing.

8. The food steamer according to claim 1, wherein the valve member is configured to move between a closed position, wherein communication between the food preparation chamber and the steam generator is prevented, and an open position in which steam flows through the steam passageway between the steam generator and the food preparation chamber.

9. The food steamer according to claim 2, wherein the check valve is configured to prevent a flow of steam along the steam passageway until the steam pressure is sufficient to prevent a return flow of contaminants along the steam passageway.

10. The food steamer according to claim 1, wherein the contamination prevention means is configured to form a fluid seal when steam is not flowing from the steam generator to the food preparation chamber.

11. The food steamer according to claim 1, wherein the steam generator comprises a negative pressure release means configured to allow the flow of air from outside the food steamer into the boiler when a negative pressure is formed in the boiler.

12. The food steamer according to claim 11, wherein the negative pressure release means is integrally formed with a seal of the boiler.

13. An apparatus for preventing the ingress of contaminants from a food preparation chamber into a steam generator of a food steamer through a steam passageway, comprising:
- a housing having a bore formed through it, the housing forming part of the steam passageway which extends between the steam generator and the food preparation chamber,
- wherein the housing is removably mountable to the steam passageway via an integrated handle extending from an outer surface of the housing,
- wherein the integrated handle has a rectangular configuration hingedly coupled to the housing,
- a contamination prevention means disposed along the steam passageway and configured to prevent the ingress of contaminants from the food preparation chamber into the steam generator,
- a resilient plate valve disposed at an upper end of the housing acting as a valve member, the resilient plate valve located on a circumferentially extending ridge of the housing, the ridge acting as a valve seat to receive the resilient plate valve,
- the resilient plate valve comprised of a deformable and resilient circular rubber plate fixedly mounted at its center and disposed at the upper end of the housing having a bore formed through it forming part of the steam passageway,
- the resilient plate valve having a higher density than water to prevent the resilient plate valve from moving into an open position when the contamination prevention means is immersed in water,
- the housing comprising a stop spaced apart from and above the ridge acting as the valve seat to limit movement of the valve member in the bore,
- wherein the housing is configured to be removably mounted to the steam passageway to form part of the steam passageway disposed between the food preparation chamber and the steam generator to prevent the ingress of contaminants into the steam generator,
- wherein the contamination prevention means is configured to open gradually dependent on the pressure of the steam, such that steam passes through the contamination prevention means at a high velocity when the contamination prevention means is in an open position,
- wherein the high velocity steam urges fluids and solids away from the contamination prevention means and prevents the fluids and solids from passing into the steam generator,
- wherein in an operating mode, as steam passes through the contamination prevention means at a high velocity the circular rubber plate portion of the valve member is resiliently deformed from its closed position to an open position, and
- wherein in a non-operating mode, the contamination prevention means is in a closed position and forms a seal so that any fluids or solids disposed in the food preparation chamber cannot pass into the steam generator.

* * * * *